111# United States Patent [19]

Kempter et al.

[11] 4,086,292

[45] Apr. 25, 1978

[54] SURFACE-COATING BINDERS

[75] Inventors: Fritz Erdmann Kempter, Mannheim; Heinrich Hartmann; Herbert Spoor, both of Limburgerhof, all of Germany

[73] Assignee: BASF Aktiengesellschaft, Ludwigshafen, Germany

[21] Appl. No.: 713,786

[22] Filed: Aug. 12, 1976

[30] Foreign Application Priority Data

Sep. 19, 1975 Germany ........................ 2541801

[51] Int. Cl.² ............................................ C08L 63/00
[52] U.S. Cl. ............................. 260/831; 204/181 R; 204/181 C; 260/830 P
[58] Field of Search ........................... 260/831, 830 P

[56] References Cited

U.S. PATENT DOCUMENTS

| | | | |
|---|---|---|---|
| 3,285,991 | 11/1966 | Sellers | 260/831 |
| 3,462,237 | 9/1969 | Sellet | 260/831 |
| 3,632,665 | 1/1972 | Aggias | 260/831 |
| 3,790,606 | 2/1974 | Sellet | 260/831 |
| 3,984,376 | 10/1976 | Yokono | 260/831 |

FOREIGN PATENT DOCUMENTS 763,347 12/1956 United Kingdom ............ 260/830 P

*Primary Examiner*—Paul Lieberman
*Attorney, Agent, or Firm*—Keil, Thompson & Shurtleff

[57] ABSTRACT

A surface-coating binder which is substantially free from epoxide groups is obtained by reacting Mannich bases, obtained from condensed phenols, secondary amines which contain at least one hydroxyalkyl group, and formaldehyde, with epoxy resins having an epoxide value of from 0.15 to 0.6, which carry blocked isocyanate groups. In the protonized form, the binders may be used for the cationic electrocoating of metal articles.

12 Claims, No Drawings

SURFACE-COATING BINDERS

The present invention relates to surface-coating binders which are obtained by reacting Mannich bases with epoxy resins containing blocked isocyanate groups, and to the use of the binders, in a protonized water-dilutable form, as cationic electrocoating binders.

A plurality of cationic electrocoating binder systems which contain urethane, amine and, at times, hydroxyl groups have already been proposed.

These finishes give good results inter alia in respect of corrosion protection, throwing power and bath stability, but are not fully satisfactory in respect of the overall properties of the binder. An essential defect of the conventional systems is, inter alia, that they cannot be processed in the pH range of from 7 to 9 which is employed in anodic electrocoating. A further disadvantage is that the indicated crosslinking reactions are unsuitable for the desired pH range.

Cationic electrocoating binders, which inter alia exhibit very good corrosion protection and which can be deposited at an alkaline pH, above 7, have also been disclosed. These are reaction products of Mannich bases, obtained from condensed phenols, secondary amines and formaldehyde, with epoxy resins. Essentially, the diethanolaminomethylene group or the alkylethanolaminomethylene group of the Mannich base is responsible for the crosslinking which takes place on baking the surface coatings. A disadvantage of these systems is that amines, especially dialkylamines, are eliminated on baking.

It is an object of the present invention to provide cationic electrocoating binders which, in respect of the essential properties of the binder, substantially meet the required standards. In particular, it is an object of the invention to provide binders which eliminate little or no amine on baking. The pH range of the coating baths should be from 7 to 9 because, in order to be able to use the baths in the processing equipment conventionally available, the coating bath must have a pH above 7.

We have found that the above objects are achieved by surfacecoating binders which are substantially free from epoxide groups and which are obtained by reacting (A) Mannich bases obtained from
  ($a_1$) condensed phenols,
  ($a_2$) secondary amines which contain at least one hydroxyl group and
  ($a_3$) formaldehyde, with ($B_1$) epoxy resins having an epoxide value of from 0.15 to 0.6, which carry blocked isocyanate groups, with or without ($B_2$) epoxy resins which are free from urethane groups.

Particularly suitable surface-coating binders are those which have been obtained by reacting from 15 to 80, preferably from 25 to 75, percent by weight of component (A) with from 85 to 20, preferably from 75 to 25, percent by weight of component ($B_1$), with or without up to 30 percent by weight of component ($B_2$). Further preferred surface-coating binders are those in which reaction products of partially blocked diisocyanates with hydroxyl-containing epoxy resins obtained from epichlorohydrin and polyhydric alcohols are employed as component ($B_1$).

The following may be noted with regard to individual components:

The Mannich bases A are manufactured from
  ($a_1$) condensed phenols,
  ($a_2$) secondary alkanolamines and
  ($a_3$) formaldehyde.

Suitable condensed phenols ($a_1$) are polyhydric phenols which contain at least two aromatic rings; particularly suitable phenols are those of the general formula

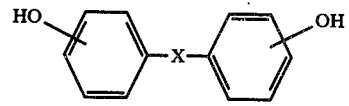

where the hydroxyl groups are in the ortho-position or para-position to X, and X is a straight-chain or branched, divalent aliphatic radical of 1 to 3 carbon atoms, or is $SO_2$, SO, O or

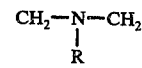

(where R is alkyl of 1 to 6 carbon atoms); bisphenol A is preferred. Low molecular weight reaction products of phenols with formaldehyde, ie. novolacs, may also be employed. Condensed phenols which contain at least one phenolic hydroxyl group and in addition contain one or more ether groups in the molecule may be present at the same time. These products have the general formula

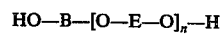

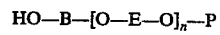

where B is

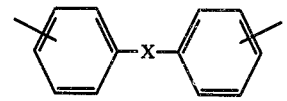

and X has the above meanings, E is a hydroxyl-containing radical which is obtained by addition reaction of an epoxy compound with a phenolic hydroxyl group, P is phenyl or alkylphenyl and $n$ is an integer from 1 to 3; the epoxy compounds used for E are preferably the glycidyl ethers of bisphenol A, pentaerythritol, glycerol, trimethylolpropane, glycol, glycol ethers or other polyhydric, preferably dihydric to tetrahydric, alcohols.

Other suitable compounds with epoxide groups are diepoxides containing nitrogen, as described in U.S. Pat. No. 3,365,471, epoxy resins obtained from 1,1-methylene-bis-(5-substituted hydantoin) according to U.S. Pat. No. 3,391,097, diepoxides obtained from bisimides according to U.S. Pat. No. 3,450,711, epoxylated aminomethyl diphenyl oxides according to U.S. Pat. No. 3,312,664, heterocyclic N,N'-diglycidyl compounds according to U.S. Pat. No. 3,503,979, aminoepoxyphosphates according to British Pat. No. 1,172,916 or 1,3,5-triglycidyl isocyanurates.

Particularly preferred components $a_1$) are the reaction products, which contain phenolic groups and are practically free from epoxide groups, of glycidyl ethers of bisphenol A or of polyhydric aliphatic alcohols, such as pentaerythritol, trimethylolpropane and glycerol, with bisphenol A. Such products in general have molecular weights of from 650 to 1,300 and epoxide values of from 0.004 to 0.01 and may be manufactured, for example, at from 160° to 180° C, or at appropriately lower temperatures if reaction catalysts are present.

The secondary amines ($a_2$) contain at least one hydroxyalkyl group. Diethanolamine, or a mixture of diethanolamine and a secondary alkylalkanolamine, are particularly suitable. It is also possible to use N-alkylethanolamines where alkyl is of 1 to 10 carbon atoms and may be straight-chain, branched or cyclic. Amines of the type of N-alkoxyethylethanolamine may also be employed.

The formaldehyde ($a_3$) is preferably used in the form of solutions of formaldehyde in alcohols, eg. in butanol, or of formaldehyde donors, eg. paraformaldehyde.

The Mannich bases (A) are manufactured from the components ($a_1$), ($a_2$) and ($a_3$) in accordance with the conventional methods disclosed in the literature, cf., for example, Houben-Weyl, Methoden der organischen Chemie, volume XI/1, page 731 (1957), in general at from 25° to 100° C, in the presence of an alcohol. The ratios of the starting materials employed depend on the desired properties but the molar ratio of the component ($a_1$) to component ($a_2$) is preferably from 1:1 to 1:3. In general, however, one mole of secondary amine ($a_2$) is employed per phenolic hydroxyl group. The amount of ($a_3$) is at least one mole, per mole of ($a_2$).

The epoxy resins ($B_1$), containing blocked isocyanate groups, are resins having an epoxide value of from 0.15 to 0.6, preferably from 0.2 to 0.4. The starting materials are preferably hydroxylcontaining epoxy resins which are obtained by reacting polyhydric alcohols, eg. pentaerythritol, trimethylolpropane or glycerol, with epichlorohydrin, and which have a low viscosity.

These products are usually reacted with partially blocked diisocyanates at from 60° to 120° C until virtually no further free isocyanate groups remain. Aromatic isocyanates, eg. toluylenediisocyanates, are particularly suitable. Preferred blocking agents are alcohols, which may be straight-chain, branched or cyclic alcohols, eg. ethylhexanol, tert.-butanol, furfuryl alcohol, cyclohexanol, alkyl glycols, alkyldiglycols and alkyltriglycols. However, other conventional blocking agents, eg. oximes, lactams or malonic acid esters, may also be used.

Suitable epoxy resins $B_2$ which are free from urethane groups are the conventional polyepoxy compounds, eg. reaction products of polyhydric phenols, especially those of the formula referred to under ($a_1$)

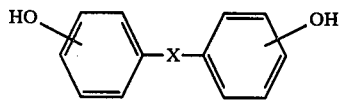

with epichlorohydrin, but also the above reaction products of polyhydric alcohols, eg. pentaerythritol, trimethylolpropane or glycerol, with epichlorohydrin, and reaction products, containing epoxide groups, of epoxy resins with secondary amines or with hydroxylcontaining glycol ethers.

The reaction of the component (A) with the component (B) is in general carried out at from 20° to 100° C, preferably from 60° to 80° C, and preferentially in the presence of organic solvents, eg. alcohols or glycol ethers.

In the reaction of the Mannich base (A) which the epoxy resin (B), the main reaction may be assumed to be an auto-catalyzed etherification of the phenolic hydroxyl groups by the epoxide groups. Furthermore, quaternization of the nitrogen atom of the Mannich base must be considered to be a possibility.

It is essential that the reaction product obtained from components (A) and (B) is substantially free from epoxide groups, ie. contains not more than 0.3, preferably less than 0.1, epoxide group per molecule of the reaction product. If the epoxide groups of component (B) are present in excess, they may subsequent to the reaction be removed by suitable reactions, eg. with acids or amines.

The binders of the invention may also be obtained by another method if, for example, the above condensed phenols which contain ether groups and alcoholic hydroxyl groups are reacted with the partially blocked isocyanates and then reacted further with the epoxy resins ($B_2$) described above.

The surface-coating binders of the invention may be diluted with conventional solvents for surface coatings, eg. isopropanol or decanol or aqueous organic solvents, and may then be applied — if appropriate together with pigments, fillers and the conventional assistants — onto the base to be coated, eg. onto wood, metal, glass or ceramic, using conventional surface-coating methods, eg. spraying, dipping or flooding; they are then dried and cured at temperatures above 170° C. The coatings thus obtained are very hard and solvent-resistant.

Preferably, however, the surface-coating binders are protonized with acids, eg. phosphoric acid and its derivatives, or preferably with water-soluble carboxylic acids, eg. acetic acid, formic acid or lactic acid. The protonized surface-coating binder is waterdilutable and may be processed by conventional surface-coating methods, again giving coatings with valuable properties. The degree of protonization should be kept as low as possible.

However, the preferred use of the protonized surface-coating binders is the cathodic electrocoating of electrically conducting surfaces, eg. metal articles or sheets of brass, copper, aluminum, iron or steel, which may or may not have been chemically pretreated, eg. phosphatized.

The aqueous solutions or dispersions of the surface-coating binders, which are at least partially in the form of a salt of a water-soluble carboxylic acid, may in addition contain other assistants which can be deposited cathodically, eg. pigments, fillers, soluble dyes, solvents, agents to improve levelling, stabilizers, curing catalysts or anti-foam agents.

For cathodic electrocoating, the solids content is in general brought to from 5 to 20 percent by weight by dilution with deionized water. Coating is carried out at from 15° to 40° C for from 1 to 2 minutes, with the bath at a pH of from 7.0 to 10.2, preferably from 7.0 to 8.5, and using deposition potentials of from 50 to 500 volt. After rinsing the film which has been cathodically deposited on the electrically conducting article, the film is cured for from 10 to 30 minutes at from about 170° to 220° C, preferably for 20 minutes at from 180° to 200° C.

The crosslinking of the binders during baking takes place via the alkanolaminomethyl group of the binders and via the blocked isocyanate groups. The contribution of these two possible mechanisms of crosslinking depends essentially on the amount of the individual groups, on the degree of etherification resulting from the reaction of components (A) and (B), on the alkanolamine used and on the blocking agent of the blocked isocyanate group.

The finishes of the invention give coatings with good mechanical properties when applied to the bases; in particular their hardness and scratch resistance is good, and at the same time they possess good elasticity and adhere firmly. Furthermore, the coatings are highly solvent-resistant and prove particularly resistant in the salt spray test.

In the Examples, parts and percentages are by weight.

EXAMPLES

A. Manufacture of the Mannich bases a. 700 parts of diethanolamine, 1,100 parts of isobutanol, 750 parts of bisphenol A and 210 parts of technical-grade paraformaldehyde are stirred under nitrogen. The batch is heated to 80° C in the course of half an hour and is then kept at this temperature for two hours. The solids content of the Mannich base is about 54%.

b. 210 parts of the diglycidyl ether of pentaerythritol (Epikote 162 from SHELL AG) are reacted with 36.6 parts of phenol for 30 minutes at 180° C. 182.5 parts of bisphenol A are then added. This causes the temperature of the batch to fall to 120° C. The batch is reheated to 180° C in the course of 30 minutes and is kept at this temperature for one hour. It is then cooled to about 130° C and brought to a solids content of 70% with 200 parts of isobutanol. The Mannich base is manufactured by condensation (2.5 hours at 80° C) of 428 parts of the above product, 200 parts of bisphenol A, 294 parts of diethanolamine and 75 parts of paraformaldehyde in 310 parts of isobutanol and 160 parts of methylglycol acetate. The solids content is about 56%.

B. Manufacture of the epoxy resin containing isocyanate groups a. 130 parts of ethylhexanol are added dropwise in the course of 30 minutes to 174 parts of toluylenediisocyanate at 80° C. The mixture is allowed to react for a further 30 minutes at 80° C. 226.5 parts of the diglycidyl ether of pentaerythritol (Epikote 162 from SHELL) are added dropwise, at from 70° to 80° C, to the partially blocked polyisocyanate obtained, and the mixture is allowed to react for a further 4 hours at 80° C. The dark yellow, viscous product has an isocyanate content of about 0.3% and an epoxide value of 0.26.

b. 74.1 parts of tert.-butanol are added dropwise in the course of 40 minutes to 174 parts of toluylenediisocyanate at 90° C. After a further 45 minutes, 350 parts of Epikote 162 are added in the course of 35 minutes. The mixture is then kept at 90° C for a further 75 minutes. A pale yellow, viscous product having an isocyanate content of about 0.02% and an epoxide value of 0.34 is obtained.

C. Manufacture of the surface-coating binder according to the invention 1. 227 parts of the Mannich base A$a$ and 190 parts of the epoxy resin B$a$, together with 50 parts of isopropanol, are reacted for 5 hours at 70° C. The solids content of the clear yellow product is 67.5%.

2. 450 parts of the Mannich base A$a$ and 400 parts of the epoxy resin B$a$, together with 160 parts of the glycidyl ether of bisphenol A (as the epoxy resin B$_2$ which is free from urethane groups), having an epoxide value of 0.5, and 270 parts of isopropanol, are reacted for 7 hours at 70° C under nitrogen. The solids content of the clear, slightly colored product is 66.5%.

3. 400 parts of the Mannich base A$a$ and 450 parts of the epoxy resin B$a$, together with 160 parts of the glycidyl ether of bisphenol A, having an epoxide value of about 0.5 (as the epoxy resin which is free from urethane groups) and 400 parts of isopropanol are reacted for 8 hours at 70° C under nitrogen. 120 parts of di-n-butylamine (to remove excess epoxide groups) are then added and the mixture is stirred for a further hour at 70° C. The solids content of the clear pale yellow product is 75%.

4. 733 parts of the Mannich base A$b$ and 315 parts of the epoxy resin B$a$, together with 76.5 parts of a glycidyl ether of bisphenol A, having an epoxide value of about 0.2 (as the epoxy resin which is free from urethane groups) and 60 parts of isopropanol are reacted for 6 hours at 70° C. The solids conent of the clear yellow resin is 70%.

D. Electrocoating

1. To prepare a 10% strength coating bath, 300 parts of the solid resin C1 are protonized with 1.5% of acetic acid and diluted to 3 liters with water. The coating bath is substantially freed from the solvents by stirring at 30° C for 48 hours; it has a pH of 7.6.

After coating (2 minutes, 250 volts at 30° C) a phosphatized steel sheet, and curing (20 minutes at 190° C), a smooth, glossy and very hard coating which is about 20 $\mu$ thick is obtained. Migration under the coating on exposure in the salt spray test is 4 mm after 500 hours.

2. A 10% strength coating bath is prepared from solid resin C2, using 1.95% of acetic acid, and is made ready for the coating operation. The pH is 7.4. After coating (2 minutes at from 150 to 300 volts at 30° C) a phosphatized steel sheet, and curing (20 minutes at 190° C), a smooth coating which withstands bending is obtained. Migration under the coating on exposure in the ASTM salt spray test (DIN SS 50,021) is from 1 to 4 mm after 500 hours.

3. To prepare a 10% strength coating bath, 400 parts of the solid resin C3 (after having been stored for about 6 weeks) are protonized with 1.825% of acetic acid and diluted with water to 4 liters (pH 7.1, conductivity 0.96 $\times$ 10$^{-3}$ Siemens). The coating bath is substantially freed from the solvents by stirring for two days at 30° C. After coating (2 minutes, 250 volts at 30° C) phosphatized steel sheets, and curing (20 minutes at 190° C), very smooth, glossy coatings which are about 20 $\mu$ thick are obtained. Migration under the coatings on exposure in the salt spray test is from 0 to 3 mm, depending on the iron phosphatizing used, after 240 hours.

After aging the coating bath (for 20 days at 30° C), the pH remains at 7.1 and the conductivity at that stage is 1.10 $\times$ 10$^{-3}$ Siemens. If phosphatized steel sheets are coated under the above conditions, smooth and glossy coatings which are from 15 to 16 $\mu$ thick are again obtained. The throwing power is at least comparable to that of good anionic electro-coating finishes.

4. To prepare a 12% strength coating bath, 370 parts of the solid resin C4 are protonized with 1.25% of acetic acid, diluted to 3 liters with water and aged by stirring for two days at 30° C. The pH of the coating bath is 7.8. After coating (2 minutes, 280 volts at 30° C) steel sheets treated with iron phosphate, and curing (20 minutes at 190° C), satisfactory coatings which are from 11 to 14 $\mu$ thick are obtained. The migration under the coatings on exposure in the salt spray test is from 1.0 to 2.5 mm after 500 hours.

We claim:

1. A surface-coating binder which is substantially free from epoxide groups and is obtained by reacting
   (a) 15 to 80% by weight of Mannich bases obtained from
      ($a_1$) condensed phenols,
      ($a_2$) secondary amines which contain at least one hydroxyalkyl group and
      ($a_3$) formaldehyde with
   (B) 85 to 20% by weight of epoxy resins having an epoxide value of from 0.15 to 0.6, which are virtually free from free isocyanate groups, carry blocked isocyanate groups and are prepared by the reaction of hydroxy-containing epoxy resins with partially blocked diisocyanates.

2. A surface-coating binder as claimed in claim 1, wherein the Mannich bases (A) have been reacted with a mixture of epoxy resins, which carry blocked isocyanate groups, and epoxy resins, which carry blocked isocyanate groups.

3. A surface-coating binder as claimed in claim 1, wherein the component ($a_1$) is a polyhydric phenol which contains at least two aromatic rings.

4. A surface-coating binder as claimed in claim 1, wherein the component ($a_1$) is bisphenol A.

5. A surface-coating binder as claimed in claim 1, wherein the component ($a_1$) is a reaction product, which is practically free from epoxide groups, of glycidyl ethers of bisphenol A with bisphenol A.

6. A surface-coating binder as claimed in claim 1, wherein the component ($a_1$) is a reaction product, which is practically free from epoxide groups, of glycidyl ethers of polyhydric aliphatic alcohols with bisphenol A.

7. A surface-coating binder as claimed in claim 1, wherein the component ($a_1$) is a reaction product, which is practically free from epoxide groups, of glycidyl ethers of bisphenol A with bisphenol A and phenol.

8. A surface-coating binder as claimed in claim 1, wherein the component ($a_1$) is a reaction product, which is practically free from epoxide groups, of glycidyl ethers of polyhydric aliphatic alcohols with bisphenol A and phenol.

9. A surface-coating binder as claimed in claim 1, wherein the component ($a_2$) contains one or more compounds from the group comprising diethanolamine and alkylalkanolamines.

10. A surface-coating binder as claimed in claim 1, wherein the component (B) is a reaction product of partially blocked diisocyanates and hydroxyl-containing epoxy resins based on pentaerythritol, trimethylolpropane or glycerol.

11. A surface-coating binder as claimed in claim 1, which has been manufactured by reacting from 15 to 80 percent by weight of component (A) with from 85 to 20 percent by weight of component (B) and up to 30 percent by weight of an epoxy which is free from urethane groups.

12. A surface coating binder as claimed in claim 1, wherein the surface coating binder is protonized.

* * * * *